United States Patent [19]

Dicks et al.

[11] Patent Number: 5,233,164
[45] Date of Patent: Aug. 3, 1993

[54] MODIFIED HEATER FOR IN SITU SOIL HEATING

[75] Inventors: Lynton W. R. Dicks, Houston; Paul C. Johnson, Sugar Land; Arnold R. Marsden, Jr.; David A. Weingaertner, both of Houston, all of Tex.

[73] Assignee: Shell Oil Company, Houston, Tex.

[21] Appl. No.: 800,192

[22] Filed: Nov. 27, 1991

[51] Int. Cl.⁵ .............................. H05B 3/44
[52] U.S. Cl. ................. 219/528; 219/201; 219/213
[58] Field of Search .......... 219/200, 201, 528, 535, 219/552, 553, 213

[56] References Cited

U.S. PATENT DOCUMENTS

| | | |
|---|---|---|
| 416,360 | 12/1889 | Dewey . |
| 1,996,708 | 4/1935 | Parsons . |
| 3,214,571 | 10/1965 | Indoe . |
| 3,272,968 | 9/1966 | Volker .................... 219/535 |
| 3,444,357 | 5/1969 | Drugmand ................. 219/535 |
| 4,842,448 | 6/1989 | Koerner .................... 405/258 |
| 4,984,594 | 1/1991 | Vinegar et al. .............. 134/21 |

OTHER PUBLICATIONS

Kaopak Heating System, Neoweld Electric, Inc, undated.

Primary Examiner—Teresa J. Walberg

[57] ABSTRACT

A heater blanket for use in soil remediation utilizes a rigid construction which isolates the heater elements from air, water, and contaminant vapors which could act to oxidize, embrittle or otherwise degrade the integrity of the electrical heaters. A rigid structural frame is constructed from a support frame of parallel members which are rigidly connected to a series of support tubes perpendicular thereto. The support tubes enclose and protect the heater elements. One or more heater modules thus constructed may be easily transported to a selected site.

10 Claims, 1 Drawing Sheet

MODIFIED HEATER FOR IN SITU SOIL HEATING

BACKGROUND OF THE INVENTION

1. Field of the Invention

The invention relates to an improved design for a heater blanket for use in decontamination of soil.

2. Description of the Prior Art

Assignee's U.S. Pat. No. 4,984,594 discloses an in-situ method for remediation and decontamination of surface and near-surface soils by evacuating the soil under a flexible sheet, which is impermeable to gases, and heating the soil surface with a relatively flat electric surface heater, which is permeable to gases. This patent discloses that the surface heater may be a mesh constructed from a conducting metal, such as stainless steel or resistance wire sold under the trademark, NICHROME, which can tolerate temperatures as high as 1000° C. or more. The mesh has a total effective resistance of several ohms and good mechanical strength for durability when dragged over rough terrain. A 325 mesh of 304 stainless steel with wire 0.0014-inch in diameter is preferred. This patent discloses that the surface heater may also be constructed of metal wires which loop back and forth but do not form a mesh. For example, the metal wires could be stitched into a ceramic fiber cloth such as wire-reinforced NEXTEL 440 a trademark of Minnesota Mining & Manufacturing Co. of St. Paul, Minn. The surface heater could also consist of metal strips or ribbons or a metallic coating in a defined pattern. Still another possibility is to construct the surface heater from a thin metal foil or sheet with perforations to allow gas flow through the foil or sheet.

A preferred configuration for a permeable mat with good thermal insulation properties, according to the patent, is a layer of NEXTEL ceramic fiber combined with a layer of corrugated 304 stainless steel knitted wire mesh with about ¼-inch crimp. The knitted wire mesh has extremely high gas permeability and can easily support a force of 15 pounds per square inch. Moreover, the thermal conductivity of such a knitted wire mesh is low. The permeable mat may be composed of multiple layers, including insulating layers, to reduce convection and radiation. Thus, the permeable mat may comprise a layer of NEXTEL ceramic fiber, then a layer of corrugated knitted wire mesh, then a layer of perforated aluminum foil for a radiation reflecting shield, then another layer of NEXTEL, another layer of knitted wire mesh, another aluminum foil shield, etc.

In Assignee's first soil remediation test, a 10'×10' electrical heating element was constructed from 325 mesh, 304 stainless steel, with 0.0014" diameter wires arranged in four 2.5'×10' strips in series. Total resistance of this heater at elevated temperature was about 1.3 ohms. The adjacent strips were separated by a 1" space and pegged to the ground to prevent movement. Strips were connected to each other by spot-welded stainless steel bus-bars. Copper power cables were bolted to the bus-bars at locations outside the heated zone.

After the test, inspection of the heater and insulation layers revealed that the heater had developed local hot spots and that a number of direct electrical shorts occurred through the NEXTEL cloth to the knitted stainless steel wire-mesh layer. Following the heater failure during this initial test, a new heater design, incorporating NICHROME wire elements woven into a NEXTEL cloth, and combined with a ceramic fiber insulating blanket, was installed in the test site. This alternative heater design used parallel 0.0095" diameter NICHROME wires, woven into a NEXTEL cloth. The NEXTEL cloth in turn served as the lower surface of a ½" insulating blanket of ceramic fiber. The upper surface of the insulation was covered with an "E"-Glass cloth. Thus, the heater and insulation under the flexible sheet was conveniently incorporated into a single blanket. Limitations on maximum size of wire that could be woven at the time by the supplier (3-M) resulted in a fragile heater element which, nevertheless, functioned well during the initial part of the test. By avoiding the metallic mesh, the bare wires were electrically isolated from each other with greater distances, and shorting was not experienced in the second heater.

The soil heater assembly (SHA) used during Assignee's tests at another site consisted of two, 5 ft by 10 ft heating sections. Each section contained three NICHROME heating elements encased in ceramic beads which were pinned to 4-inch thick ceramic fiber encased in NEXTEL cloth. The heating elements were run across the entire ten foot width of the SHA, spaced approximately three inches apart. The sections were then pinned to their respective 5 ft by 10 ft stainless steel frame. The heating sections were connected to a stainless steel support frame made out of structural angles and flat bars with pins that ran through the four-inch ceramic fiber insulation. Since the insulation was somewhat compressible and the pins not fixed, the heater elements could move vertically to accommodate surface irregularities of the soil. Both sections of the support frame were positioned side-by-side on the ground, bolted together, and covered by another four inches of fiber insulation. All of the insulation packages were surrounded by NEXTEL cloth for ease of handling and retaining their integrity.

Another of Assignee's invention disclosures disclosed an improved heating blanket for use in an in-situ method and apparatus for removing contaminants from surface and near-surface soil wherein a vacuum is imposed on the soil beneath an impermeable flexible sheet and the soil is then heated with an electric surface heating blanket positioned on the soil surface under the impermeable sheet. The heating blanket is permeable to vapors which emanate from the soil when heated and comprises a single piece heater construction. NICHROME 80 or Kanthal A.1 wires are substituted for NEXTEL threads in the weaving process which leaves the wires on one side of the cloth held in place by NEXTEL loops. This eliminates the need for a separate layer of NEXTEL insulating fabric over the heating elements.

SUMMARY OF THE INVENTION

An improved heater blanket for use in soil remediation utilizes a rigid construction which isolates the heater elements from air, water, and contaminant vapors which could act to oxidize, embrittle or otherwise degrade the integrity of the electrical heaters. A rigid structural frame comprises a support frame of parallel members which are rigidly connected to a series of support tubes perpendicular thereto. The support tubes enclose and protect the heater elements. One or more heater modules thus constructed may be easily transported to a selected site.

DETAILED DESCRIPTION OF THE INVENTION

As described above, all but one of the previous heaters used by Assignee have failed during field tests. It is speculated that this is at least partially due to the direct contact of the heater elements with soil and water and hydrocarbon vapor generated during the in-situ heating process. In the present invention the heater element (preferably NICHROME wire) is not exposed to these elements due to the presence of a protective stainless steel shield which encloses each heater element.

Assignee's in-situ soil heating process requires that a heater capable of producing up to 500 W/ft$^2$ at temperatures up to 1000° C. operate in a hostile environment for long periods of time. A heater element, preferably stranded NICHROME wire, is placed inside an electrically insulating sleeve, preferably NEXTEL. The sleeve and the wire are placed inside a support tube, preferably made of stainless steel. An array of tubes is rigidly connected to rigid frame members for ease of assembly/transportation. The spacing between the tubes may be 1–6 inches with bus bars connecting the wires from each individual tube to a source of electrical power.

Figure 1:
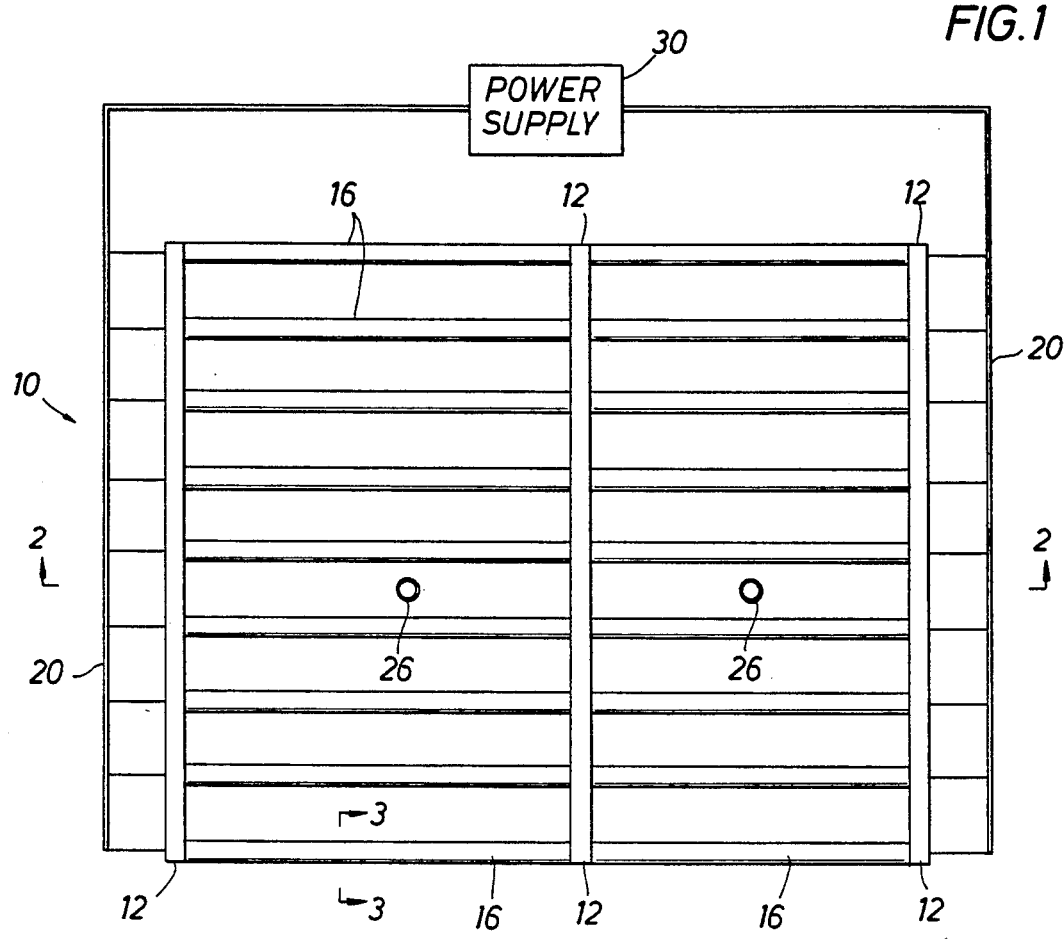
FIG. 1 is a plan view of the heater assembly according to the present invention with insulation layers removed.
Figure 2:
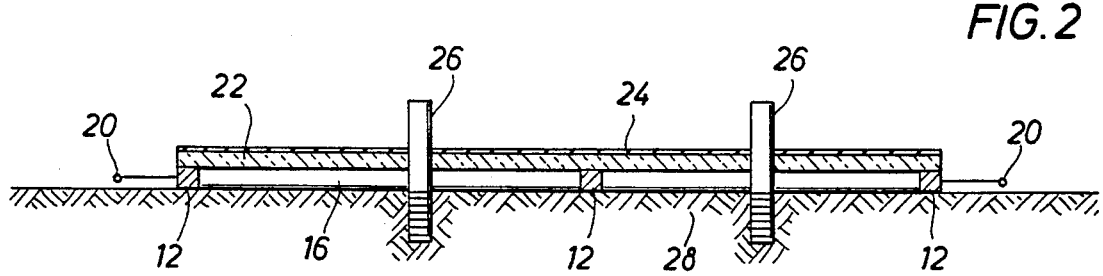
FIG. 2 is a cross-sectional view of the heater element of FIG. 1 taken through the vapor extraction tubes.
Figure 3:
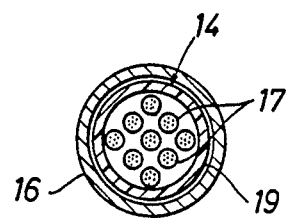
FIG. 3 shows cross-sectional details of the heater element and support tube of the present invention.

Referring to FIGS. 1, 2, and 3, the surface soil heater module designated generally at 10 is composed of rigid frame 12 and electrical heater elements 14 that are incorporated within the frame 12, rather than being merely attached to the exterior of the frame. This configuration, which is depicted in FIG. 1, is accomplished through the use of hollow structural elements or support tubes 16 which are rigidly incorporated into the frame design. Heater elements 14, shown more clearly in FIG. 3, are inserted into the stainless steel hollow frame supports 16 and are connected, via an electrical conduit 20, to a power supply 30. Heater elements 14 are electrically insulated from the heater frame members 12 and support tubes 16 by encasing a heating element 17, preferably a stranded NICHROME wire, in an insulator 19, preferably a NEXTEL fiber sheath. Each heater element 14 is inserted into a support tube 16. Attached to one side of the heater assembly 10 is a layer of insulation 22, preferably low permeability insulation such as a dense ceramic fiber, and an impermeable surface seal 24, such as a metal plate, or a silicone rubber sheet. Alternatively, the insulation package 22, 24 may be replaced by a fully enclosed air gap. Vapor extraction tubes 26 are inserted through the heater assembly 10 and into the contaminated soil 28 for withdrawing vaporized contaminants from the soil. The heater elements 14 are thus protected from air, water, and contaminant vapors, which may act to oxidize, embrittle, or otherwise degrade the integrity of the electrical heaters.

For application at a contaminated site, a modular assembly approach is utilized. That is, a number of heater "modules" 10 are constructed, then transported to the site and placed side by side to cover the zone of contamination. Typical module dimensions might be 10 ft × 20 ft, so that a number of modules 10 can be easily stacked on a flat-bed truck and placed in position on the site with the use of a crane. Once they are placed in position, the heaters 14 are connected to a power supply 30 and the vapor extraction tubes 26 are connected to a vapor recovery system (not shown) consisting of blower(s) and a vapor treatment unit (not shown) which may comprise carbon beds, catalytic oxidizers, thermal oxidizers, condensors, etc.

What is claimed is:

1. A heater module for in-situ remediation of contaminated soil comprising:
   a plurality of rigid support frame members;
   a plurality of hollow support tubes rigidly connected to and between said support frame members essentially perpendicular thereto;
   an electrical heater element enclosed in each of said support tubes, said heater elements being adapted for connection to a power supply;
   an insulating sheath surrounding each of said heater elements for electrical insulation of said heater elements from said support tubes;
   a layer of insulation covering said support frame members and said support tubes; and
   an impermeable surface seal above said layer of insulation.

2. The module of claim 1 wherein said heater elements are stranded resistance wire.

3. The module of claim 2 wherein said insulating sheath is made of ceramic fiber cloth.

4. The module of claim 1 wherein said insulating sheath is made of ceramic fiber cloth.

5. The module of claim 1 wherein said surface seal is a metal plate.

6. The module of claim 1 wherein said surface seal is a silicone rubber sheet.

7. The module of claim 1 wherein said insulation is dense ceramic fiber.

8. The module of claim 1 further comprising means in said layer of insulation and said surface seal for passing vapors therethrough.

9. The module of claim 1 further comprising means for supplying electrical power to said heater elements.

10. The module of claim 1 further comprising means for removing and treating contaminated vapors.

* * * * *